US009760244B2

(12) United States Patent
Kruglick

(10) Patent No.: US 9,760,244 B2
(45) Date of Patent: Sep. 12, 2017

(54) APPLICATION EQUIVALENCE MAP FOR SYNCHRONIZED POSITIONING OF APPLICATION ICONS ACROSS DEVICE PLATFORMS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 134 days.

(21) Appl. No.: 14/009,095

(22) PCT Filed: Nov. 30, 2012

(86) PCT No.: PCT/US2012/067473
§ 371 (c)(1),
(2) Date: Sep. 30, 2013

(87) PCT Pub. No.: WO2014/084863
PCT Pub. Date: Jun. 5, 2014

(65) Prior Publication Data
US 2014/0189527 A1 Jul. 3, 2014

(51) Int. Cl.
*G06F 3/00* (2006.01)
*G06F 3/0481* (2013.01)
*G06F 9/44* (2006.01)
(52) U.S. Cl.
CPC ........ *G06F 3/04817* (2013.01); *G06F 9/4443* (2013.01)

(58) Field of Classification Search
CPC ...... G06F 9/4443; G06F 3/0481; G06F 3/011; G06F 1/163; G06F 8/38; G06F 17/30867;
(Continued)

(56) References Cited

U.S. PATENT DOCUMENTS 8,171,171 B2   5/2012  Kim et al.
2006/0123331 A1*  6/2006  Hightower et al. .......... 715/505
(Continued)

OTHER PUBLICATIONS

Umar Saif, "Opportunistic File-Associations for Mobile Operating Systems", published in "WMCSA '06 Proceedings of the Seventh IEEE Workshop on Mobile Computing Systems & Applications", pp. 82-86, 2006.*
(Continued)

*Primary Examiner* — Doon Chow
*Assistant Examiner* — Shourjo Dasgupta
(74) *Attorney, Agent, or Firm* — Turk IP Law, LLC

(57) ABSTRACT

Technologies are presented for synchronizing associations between application icons and application functions across platforms. According to some examples, a layout and positioning of icons for different applications that perform similar functions may be synchronized across different devices. As a result, users may associate the position of an application icon on a device display with a particular function regardless of the actual device or platform. An application equivalence map may be used to synchronize application icon layout and positioning across the different devices and platforms. In other examples, icons for different applications that perform similar functions on different devices may be positioned similarly relative to equivalent display elements or features such as display corners, built-in interface elements, and comparable features.

23 Claims, 8 Drawing Sheets

(58) Field of Classification Search
CPC .......... G06F 17/3089; G06F 17/30905; G06Q 30/02
USPC .................................................. 715/744–746
See application file for complete search history.

(56) References Cited

U.S. PATENT DOCUMENTS

| | | | |
|---|---|---|---|
| 2006/0136389 A1* | 6/2006 | Cover | G06F 9/44526 |
| 2007/0271522 A1* | 11/2007 | Son et al. | 715/762 |
| 2007/0283275 A1 | 12/2007 | Azam | |
| 2010/0095217 A1* | 4/2010 | Kang | 715/738 |
| 2012/0079095 A1 | 3/2012 | Evans et al. | |
| 2012/0165071 A1* | 6/2012 | Hsu | G06F 1/1632 |
| | | | 455/557 |
| 2012/0192113 A1* | 7/2012 | Higuchi | 715/835 |
| 2012/0254767 A1* | 10/2012 | Wong et al. | 715/740 |
| 2013/0007662 A1* | 1/2013 | Bank | G06F 9/4443 |
| | | | 715/811 |
| 2013/0061296 A1* | 3/2013 | Reddy | H04L 51/02 |
| | | | 726/5 |

OTHER PUBLICATIONS

International Search Report and Written Opinion for PCT/US12/67473, filed Nov. 30, 2012, mailed Feb. 15, 2013.
Vincent, "How to: Sync Your Chrome Tabs Across Multiple Devices", http://www.cultofandroid.com/10701/how-to-sync-your-chrome-tabs-across-multiple-devices/, Blog created on May 15, 2012.

\* cited by examiner

COMPUTER PROGRAM PRODUCT 800

SIGNAL BEARING MEDIUM 802

804 AT LEAST ONE OF

ONE OR MORE INSTRUCTIONS FOR DETECTING A POSITION OF A FIRST ICON ON A FIRST DEVICE;
ONE OR MORE INSTRUCTIONS FOR DETECTING A SECOND ICON ON A SECOND DEVICE;
ONE OR MORE INSTRUCTIONS FOR ASSOCIATING THE FIRST ICON WITH THE SECOND ICON IN AN EQUIVALENCE MAP; AND
ONE OR MORE INSTRUCTIONS FOR SYNCHRONIZING VIEWS POSITIONING THE SECOND ICON BASED ON THE POSITION OF THE FIRST ICON.

| COMPUTER-READABLE MEDIUM 806 | RECORDABLE MEDIUM 808 | COMMUNICATIONS MEDIUM 810 |

FIG. 8

APPLICATION EQUIVALENCE MAP FOR SYNCHRONIZED POSITIONING OF APPLICATION ICONS ACROSS DEVICE PLATFORMS

CROSS-REFERENCE TO RELATED APPLICATION

This Application is the U.S. National Stage filing under 35 U.S.C §371 of International Application Ser. No. PCT/US2012/067473 filed on Nov. 30, 2012. The disclosure of the International Application is herein incorporated by reference in its entirety.

BACKGROUND

Unless otherwise indicated herein, the materials described in this section are not prior art to the claims in this application and are not admitted to be prior art by inclusion in this section.

As computing devices and platforms proliferate, individual users may find themselves using multiple computing devices and platforms to accomplish tasks. For example, a user may switch between a desktop computer, a laptop computer, a tablet computer, and/or a smart phone, depending on the current environment. While these devices provide or support software for performing particular tasks (e.g., web browsing, word processing, email, social networking, etc.), different devices may have different applications for performing the same task. Therefore, a user that switches between devices while performing a task may find it difficult or inefficient to find the relevant application on the new device.

SUMMARY

The present disclosure generally describes techniques for employing an application equivalence map for synchronized positioning of application icons across different device platforms.

According to some examples, a method for employing an application equivalence map for synchronized positioning of application icons across different device platforms may include detecting a position of a first icon associated with a first application relative to other icons displayed on a main view of a first user device and detecting a second icon associated with a second application on a main view of a second user device, where the first and second applications are functionally related, associating the first and second icons in the application equivalence map, and synchronizing the main views of the first and second user devices by selecting a relative position of the second icon on the main view of the second user device to be substantially similar to the relative position of the first icon on the main view of the first user device.

According to other examples, a system for employing an application equivalence map for synchronized positioning of application icons across different device platforms may include at least one server communicatively coupled to multiple user devices. The server may be configured to detect a position of a first icon associated with a first application relative to other icons displayed on a main view of a first user device and detect a second icon associated with a second application on a main view of a second user device, where the first and second applications are functionally related, associate the first and second icons in the application equivalence map, and synchronize the main views of the first and second user devices by selecting a relative position of the second icon on the main view of the second user device to be substantially similar to the relative position of the first icon on the main view of the first user device.

According to further examples, a computing device for employing an application equivalence map for synchronized positioning of application icons across different device platforms may include a display, a processor, and a communication module for communicating with a network. The processor may be configured to detect a position of a first icon associated with a first application relative to other icons displayed on a main view of the computing device and detect a second icon associated with a second application on a main view of another computing device, where the first and second applications are functionally related, associate the first and second icons in the application equivalence map, and synchronize the main views of the computing devices by selecting a relative position of the first icon on the main view of the user device to be substantially similar to the relative position of the second icon on the main view of the other computing device.

According to yet further examples, a computer readable storage medium may store instructions for employing an application equivalence map for synchronized positioning of application icons across different device platforms. The instructions may include detecting a position of a first icon associated with a first application relative to other icons displayed on a main view of a first user device and detecting a second icon associated with a second application on a main view of a second user device, where the first and second applications are functionally related, associating the first and second icons in the application equivalence map, and synchronizing the main views of the first and second user devices by selecting a relative position of the second icon on the main view of the second user device to be substantially similar to the relative position of the first icon on the main view of the first user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
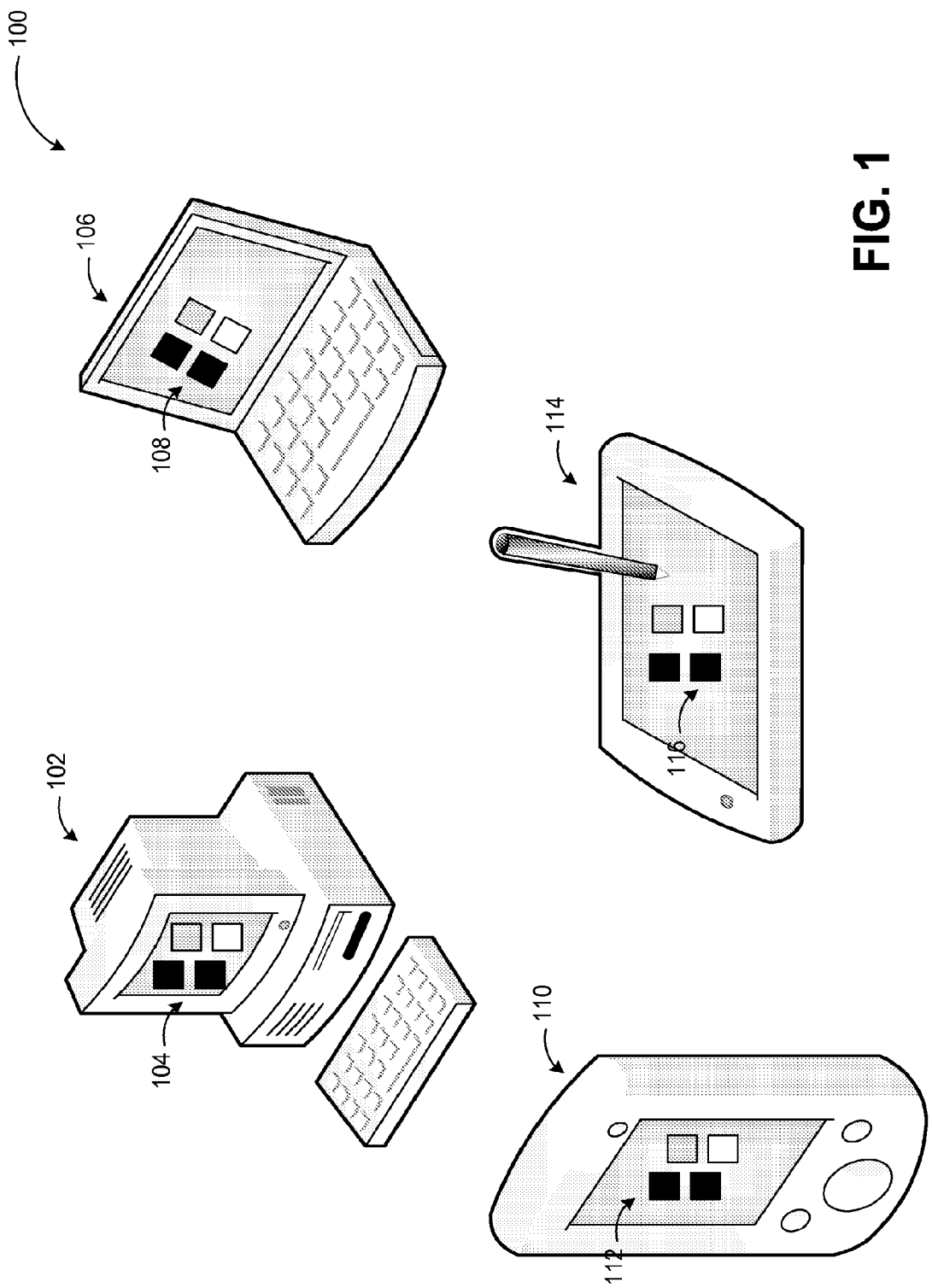
FIG. 1 illustrates preservation of icon positioning based on analogous applications across different device platforms.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, systems, devices, and/or computer program products related to employing an application equivalence map for synchronized positioning of application icons across different device platforms.

Briefly stated, technologies are generally described for synchronizing associations between application icons and application functions across platforms. According to some examples, a layout and positioning of icons for different applications that perform similar functions may be synchronized across different devices. As a result, users may associate the position of an application icon on a device display with a particular function regardless of the actual device or platform. An application equivalence map may be used to synchronize application icon layout and positioning across the different devices and platforms. In other examples, icons for different applications that perform similar functions on different devices may be positioned similarly relative to equivalent display elements or features such as display corners, built-in interface elements, and comparable features.

FIG. 1 illustrates preservation of icon positioning based on analogous applications across different device platforms, arranged in accordance with at least some embodiments described herein.

As shown in a diagram 100, different computing devices (e.g., a desktop computer 102, a laptop computer 106, a smart phone 110, a tablet computer 114, a vehicle-mount computer (not shown), and/or a wearable computer (not shown)) may provide or support execution of one or more software applications. Each software application may provide particular functionalities (e.g., web browsing, word processing, spreadsheet functionality, email, etc.). An operating system of a particular device may display supported software applications as icons on a display of the device, and may organize the icons in, for example, a row or two-dimensional array. For example, the desktop computer 102 may display application icons in a layout 104, the laptop computer 106 may display icons in a layout 108, the smart phone 110 may display icons in a layout 112, and the tablet computer 114 may display icons in a layout 116. A user may be able to execute a particular software application by selecting (e.g., with a mouse, a stylus, a touchpad, a keyboard, or any other suitable input device) the icon associated with the application.

In some embodiments, it may be desirable to have software applications that perform analogous tasks implemented across multiple devices or platforms. For example, the desktop computer 102, the laptop computer 106, the smart phone 110, and the tablet computer 114 may each support execution of a word processor, a web browser, a spreadsheet application, an email client, or any other suitable application. Moreover, it may be desirable to have icons corresponding to similar or analogous software applications laid out (e.g., positioned) similarly on different computing devices. For example, the position of a word processor icon may be placed in a similar absolute or relative position (e.g., top right or left of center, or to the left of a media player icon or below an email icon) in the layouts 104, 108, 112, and 116. This may be helpful for a user who switches between using different devices because icons for applications with similar functionalities may be located in similar positions.

Figure 2:
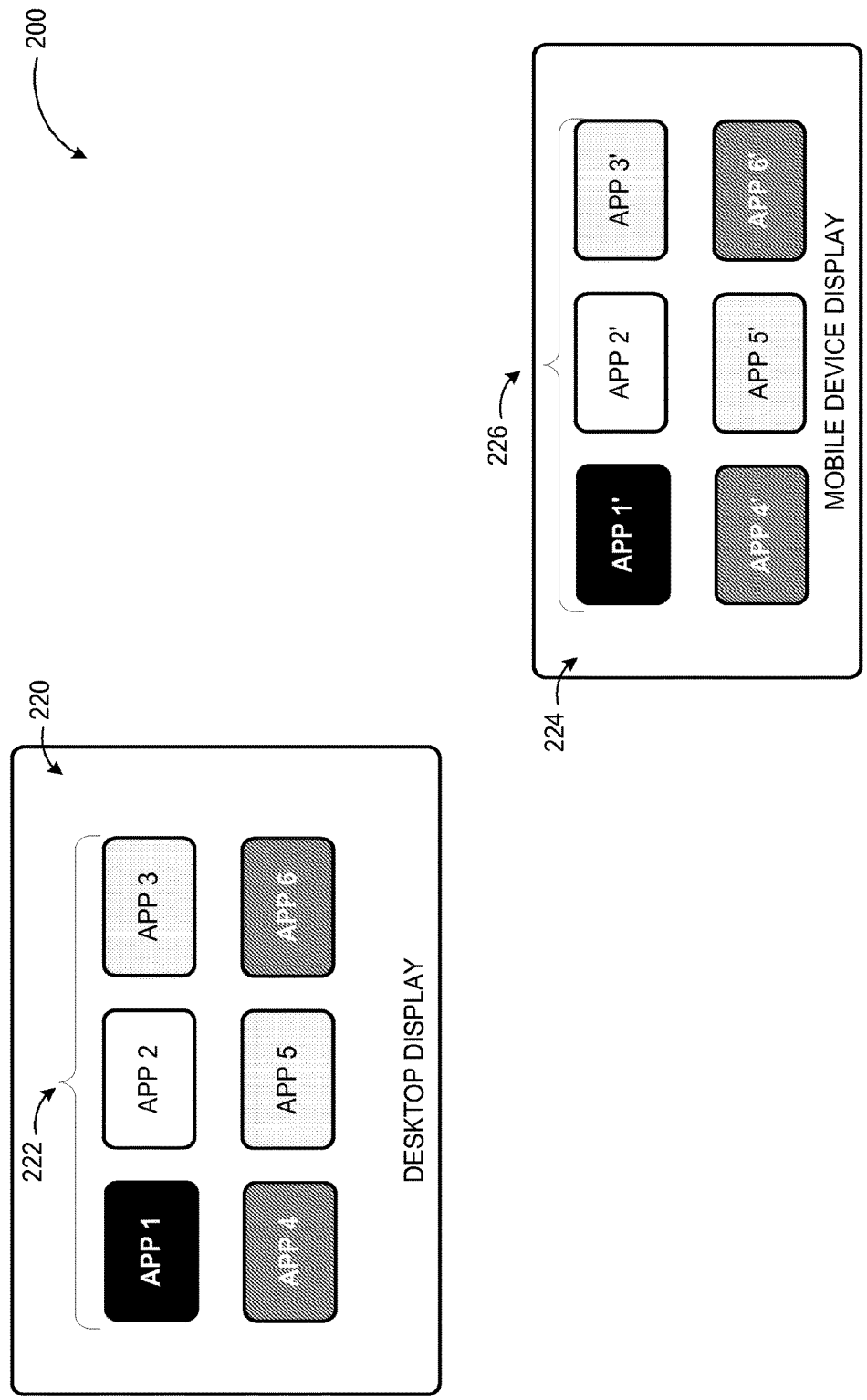
FIG. 2 illustrates preservation of icon positioning between a desktop display and a mobile device display, where the icons represent applications performing analogous tasks.

FIG. 2 illustrates preservation of icon positioning between a desktop display and a mobile device display, where the icons represent applications performing analogous tasks, arranged in accordance with at least some embodiments described herein.

As shown in a diagram 200, a desktop display 220 (e.g., the display of the desktop computer 102 in FIG. 1) may display application icons organized in a layout 222. The layout 222 may include a number of application icons, each of which may correspond to a particular software application. A mobile device display 224 (e.g., the display of the laptop computer 106, the smart phone 110, and/or the tablet computer 114 in FIG. 1) may also display application icons organized in a layout 226. The layout 226 may be similar to the layout 222 in that applications having similar functionality (e.g., app 1 in layout 222 has similar functionality to app 1' in layout 226, app 2 has similar functionality to app 2', etc.) are positioned in similar positions. For example, app 1 and app 1', which have similar functionality, are both positioned in the top left of their respective layouts. Similarly, app 6 and app 6', which have similar functionality, may both be positioned in the bottom right of their respective layouts. As described earlier, the similarity between the two layouts may make it easier for a user to switch between using the desktop computer having the desktop display 220 and the mobile device with the mobile device display 224.

In some embodiments, although some applications may have similar functionality (e.g., app 1 and app 1'), they may not be identical. For example, both app 1 and app 1' may be word processing software applications. However, app 1 may be a word processing application configured to operate on a desktop computer, whereas app 1' may be a different word processing application, such as a word processing application configured to operate on a mobile device. In some embodiments, this difference may be reflected in the actual icons for the different applications. For example, the icon for app 1 may differ from the icon for app 1' while remaining in the same relative positions on their respective displays. Even though the corresponding applications may not be identical, they may perform substantially the same function. In some embodiments, visual schemes may be used to associate the different icons to increase their similarity. For example, the different icons may share a background color, an outline, a textual scheme, a highlighting scheme, and/or a shadowing scheme. Therefore, a user may be able to easily transition between word processing in a desktop environment (via the desktop display 220) and in a mobile environment (via the mobile device display 224).

Figure 3:
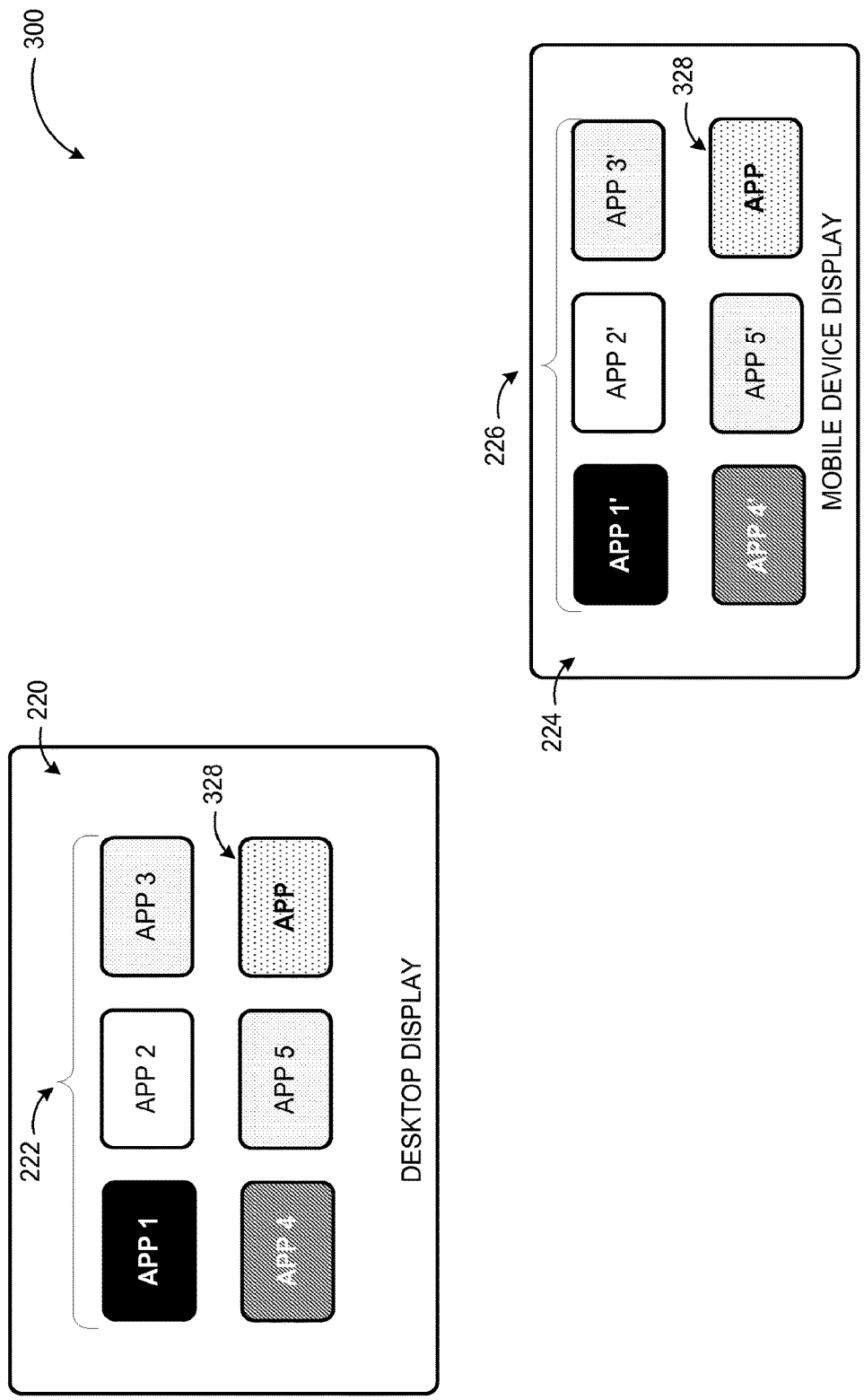
FIG. 3 illustrates the configurations of FIG. 2 with the addition of a universal icon representing applications performing analogous tasks on different devices.

FIG. 3 illustrates the configurations of FIG. 2 with the addition of a universal icon representing applications performing analogous tasks on different devices, arranged in accordance with at least some embodiments described herein.

As shown in a diagram 300, the desktop display 220 and the mobile device display 224 (similar to the corresponding displays in FIG. 2) may display application icons organized in the layouts 222 and 226. However, in the diagram 300, the layouts 222 and 226 may include one or more universal application icons 328. As described above, a desktop application may not be the same as a mobile application, despite having similar functionality. Instead of using different icons to represent the different applications in the layouts 222 and 226, a single icon, such as the universal application icon 328, may be used to represent the different applications. In some embodiments, the universal application icon 328 may represent a particular functionality instead of a particular application. For example, the same universal application icon 328 may appear on both the desktop display 220 and the mobile device display 224 and represent "word processing", "email", "web browsing", or any other suitable functionality. The universal application icon 328 may then link to the appropriate application on the particular device. For example, the universal application icon 328 on the desktop display 220 may link to a word processing application configured for a desktop computer, whereas the same universal application icon 328 on the mobile device display may link to a word processing application configured for a mobile device. This may further facilitate transitions between a desktop environment and a mobile environment, because a user only sees a single icon representing a particular functionality instead of different icons representing the same functionality.

In some embodiments, information regarding the positioning and layout of particular applications and/or functionalities may be stored in an application equivalence map or table. For example, an application equivalence map (or table) may store information about different applications (and associated icons) with similar functionality. The application equivalence map may also store information about the positioning of application icons (e.g., word-processing icons are in the upper left, email icons near the middle, web browser icons to the right of email icons, etc.). In order to preserve application icon layout and positioning between devices as described above, the application equivalence map may be provided to each computing device.

In some embodiments, an application equivalence map with default values or settings may be provided, for example, by an operating system provider or a user device provider. A user may then customize the application equivalence map to reflect actual usage. In some embodiments, the application equivalence map may be built or customized based on application usage. For example, machine learning techniques may be used to determine the applications used to open particular types of files (e.g., documents, images, videos, etc.) on different devices, and those applications may be associated together in the application equivalence map. Application providers may also provide equivalence information about their applications. For example, a provider of a mobile web browser may provide equivalence information associating the mobile web browser with one or more desktop web browsers.

In some embodiments, the application equivalence map may associate more than one application/application icon with a particular functionality on a particular device, based on content or context. For example, a desktop application (e.g., media player) may be capable of handling more file types than a single mobile application, and multiple, different mobile applications may be used to provide the same file handling capability of the desktop application. In this case, the application equivalence map may be content-sensitive, and associate the multiple, different mobile applications and their icons with the desktop application and icon. When a user indicates a file to be handled on a mobile device, an appropriate mobile application/icon may be selected based on the application equivalence map and the type of the file to be handled. Similarly, the application equivalence map may be context-sensitive. For example, a device may select an application from the application equivalence map based on the operating environment or condition of the device.

In some embodiments, an icon may link to different applications with similar functionality based on device configuration and/or location. For example, a word processing icon may link to one word-processing application if a physical keyboard is attached to the device and another word-processing application if only a touch-enabled interface is available. As another example, a video player icon may link to one video application if a large, stationary display is attached to the device and another video application if only a portable device display is available.

Figure 4:
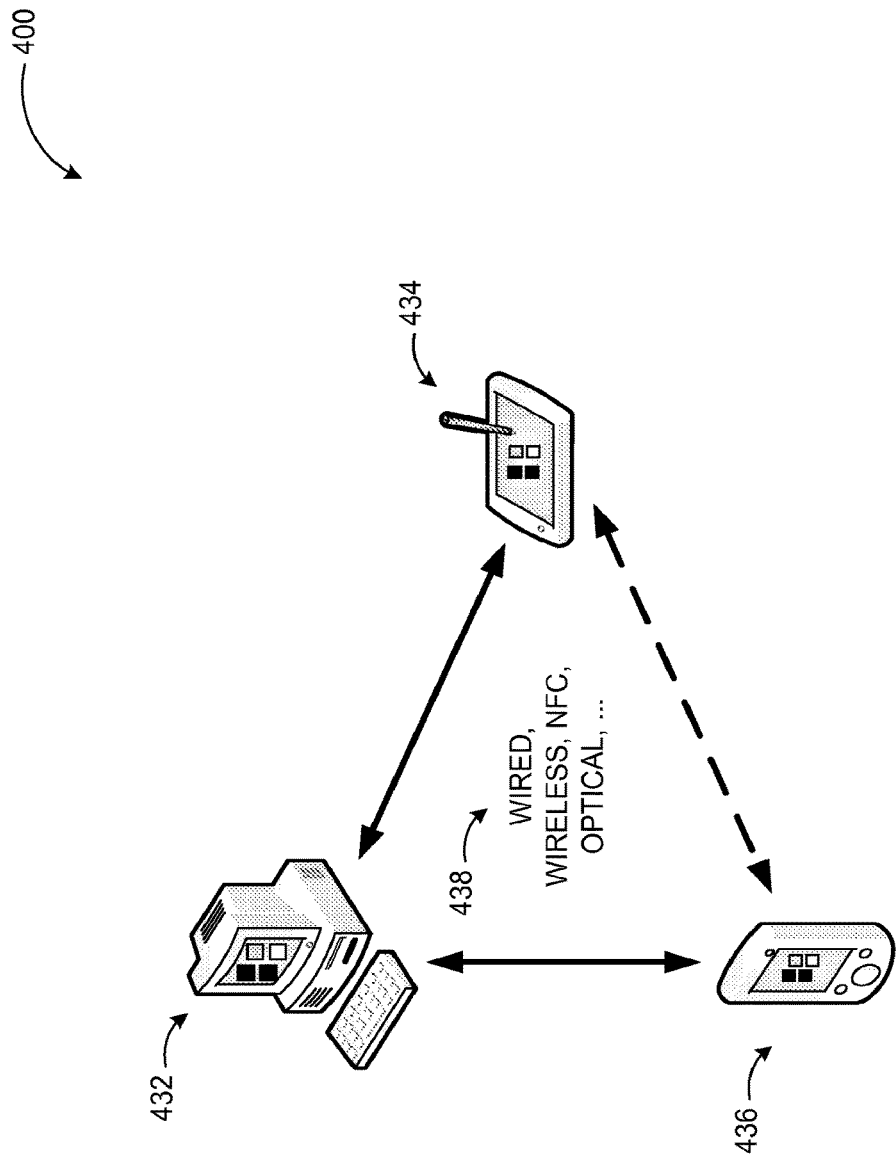
FIG. 4 illustrates synchronization of icon positioning between different devices through direct communication between the devices.

FIG. 4 illustrates synchronization of icon positioning between different devices through direct communication between the devices, arranged in accordance with at least some embodiments described herein.

According to a diagram 400, any two or more of a desktop computer 432 (similar to the desktop computer 102), a tablet computer 434 (similar to the tablet computer 114), and a smart phone 436 (similar to the smart phone 110) may synchronize application icon positioning as described above. In some embodiments, the desktop computer 432, the tablet computer 434, and the smart phone 436 may synchronize icon positioning by directly communicating information about implemented applications, functionalities, and icon positioning with each other. For example, a direct communication 438 between the desktop computer 432 and the smart phone 436 and/or the tablet computer 434 may include an application equivalence map that contains information about icon positioning. In some embodiments, the tablet computer 434 may also be able to directly communicate with the smart phone 436 and vice-versa. The direct communication 438 may be via a wired connection (e.g., Ethernet, USB, or any other suitable wire protocol) and/or a wireless connection (e.g., WiFi, cellular, near-field communication or "NFC", optical, infrared, RF, or any other suitable wireless protocol).

In some embodiments, the application equivalence map may be primarily stored on a reference device (e.g., the desktop computer 432), which maintains a reference version of the application equivalence map. Other devices may then receive updated versions of the application equivalence map periodically or upon request, and may submit application equivalence map changes to the reference device. Of course, in some embodiments, each device may store a copy of the application equivalence map, and updates may be propagated between the various devices.

Figure 5:
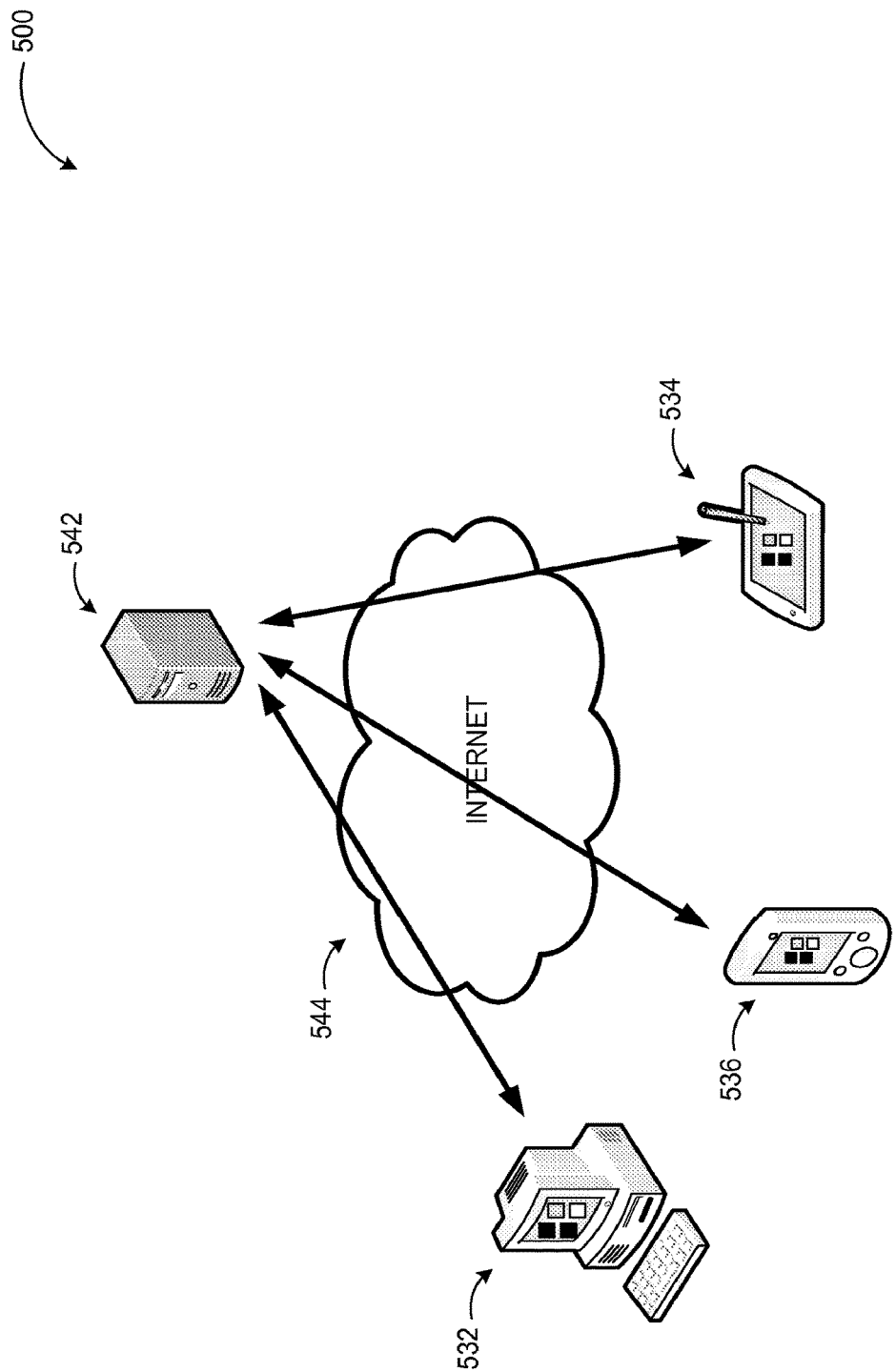
FIG. 5 illustrates synchronization of icon positioning between different devices through a networked service communicating with the devices.

FIG. 5 illustrates synchronization of icon positioning between different devices through a networked service communicating with the devices, arranged in accordance with at least some embodiments described herein.

According to a diagram 500, a desktop computer 532 (similar to the desktop computer 432), a tablet computer 534 (similar to the tablet computer 434), and a smart phone 536 (similar to the smart phone 436) may synchronize application icon positioning via a server 542. The desktop computer 532, the tablet computer 534, and the smart phone 536 may transmit and receive application icon positioning information to and from the server 542 via a network 544, such as the Internet. In some embodiments, the server 542 may be part of a cloud-based service that provides the application icon positioning synchronization as a service to the user of the computing devices. Three devices are shown in the diagram 500 for simplicity, and one skilled in the art will appreciate that a different number of devices may synchronize application icon positioning.

In some embodiments, one of the devices (e.g., the desktop computer 432 or 532) may serve as a reference device. The relative position of an application icon on the display of a reference device may be used to determine the relative positions of similar application icons on other devices (e.g., the tablet computer 434/534 and/or the smart phone 436/536). In some embodiments, associations between applications with similar functionality (and their corresponding icons) may be stored in a user configuration file, which may be stored on each device or on a network server (e.g., the server 542). Different application equivalence maps for each computing device may be generated from the user configuration file based on, for example, the capabilities and operating environment of the individual devices.

Figure 6:
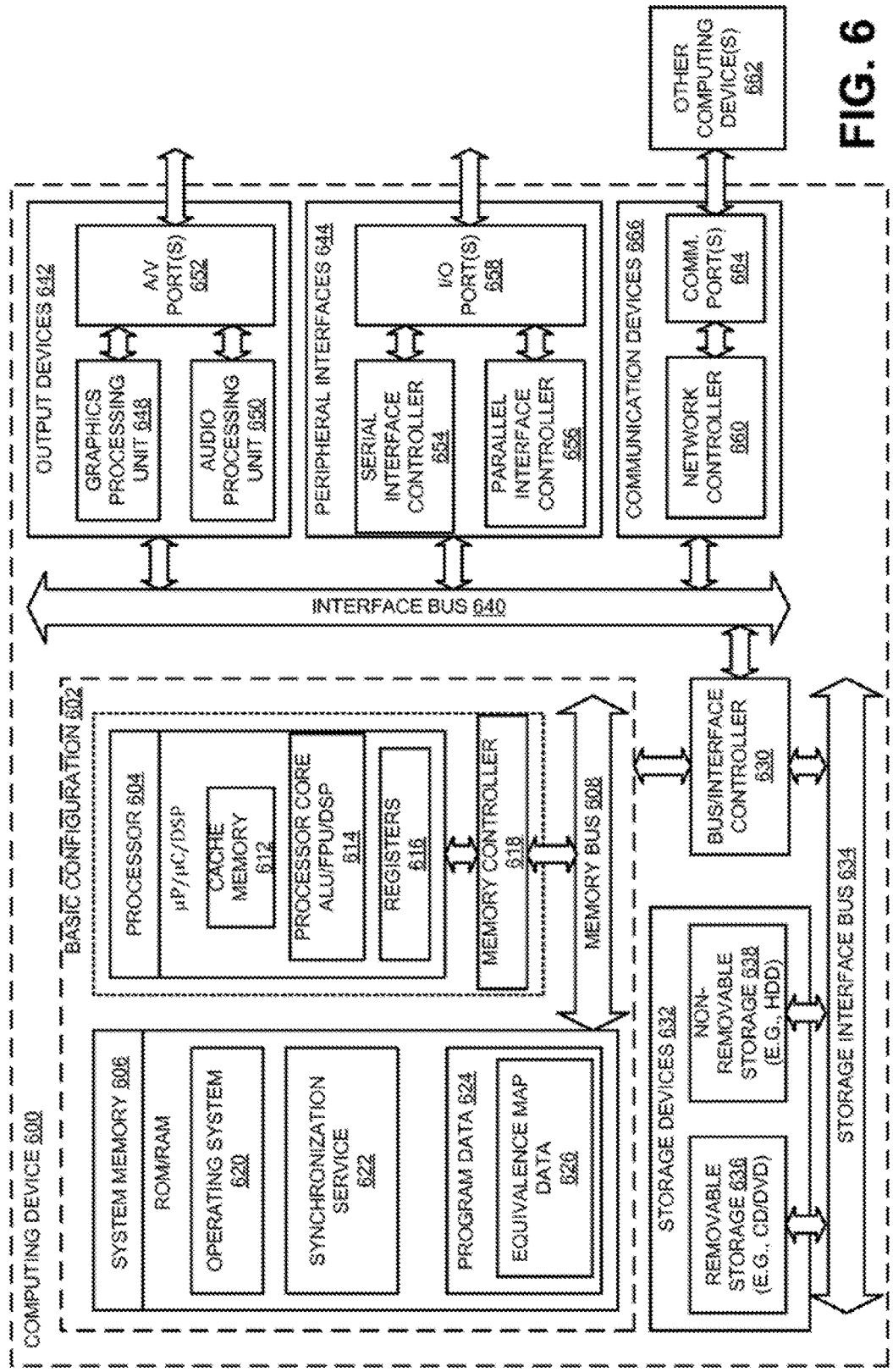
FIG. 6 illustrates a general purpose computing device, which may be used to synchronize icon positioning between different devices.

FIG. 6 illustrates a general purpose computing device, which may be used to synchronize icon positioning between different devices, arranged in accordance with at least some embodiments described herein.

For example, the computing device 600 may be used to synchronize icon positioning between different devices as described herein. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one or more levels of caching, such as a cache memory 612, a processor core 614, and registers 616. The example processor core 614 may include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a synchronization service application 622, and program data 624. The synchronization service application 622 may be configured to provide synchronization of icon positioning between different devices as described herein. The program data 624 may include, among other data, equivalence map data 626 or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, compact disc read-only memory (CD-ROM), digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods for synchronizing icon positioning between different devices. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 7:
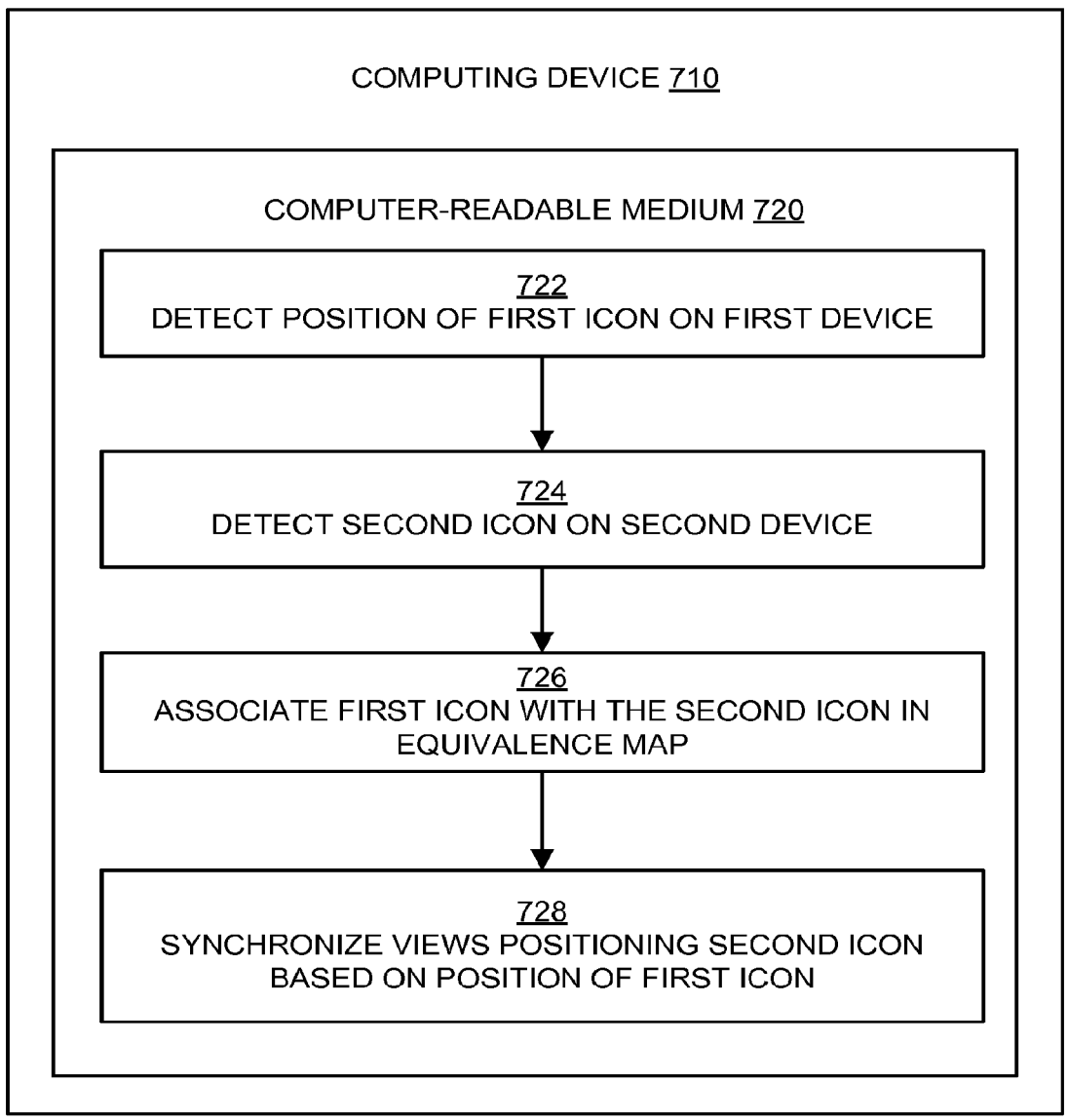
FIG. 7 is a flow diagram illustrating an example method for synchronizing icon positioning between different devices that may be performed by a computing device such as the computing device in FIG. 6.

FIG. 7 is a flow diagram illustrating an example method for synchronizing icon positioning between different devices that may be performed by a computing device such as the computing device in FIG. 6, arranged in accordance with at least some embodiments described herein.

Example methods may include one or more operations, functions or actions as illustrated by one or more of blocks 722, 724, 726, and/or 728, and may in some embodiments be performed by a computing device such as the computing device 600 in FIG. 6. The operations described in the blocks 722-728 may also be stored as computer-executable instructions in a computer-readable medium such as a computer-readable medium 720 of a computing device 710.

An example process for synchronizing icon positioning between different devices may begin with block 722, "DETECT POSITION OF FIRST ICON ON FIRST DEVICE", where the position of a first icon on the display of a first computing device (e.g., any of the computing devices depicted in FIG. 1) is detected, for example, by a synchronization service application 622 or a synchronization application/module executed on the first computing device. The first icon (e.g., the APP 1 icon in FIG. 2) may correspond to a first software application implemented on the first device.

Block 722 may be followed by block 724, "DETECT SECOND ICON ON SECOND DEVICE", where a second icon on a second computing device is detected. In some embodiments, the presence of the second icon may be detected by the synchronization service application 622 or a synchronization application executed on the second computing device, and in other embodiments, the actual position of the second icon on a display of the second computing device may be detected. The second icon (e.g., the APP1' icon in FIG. 2) may correspond to a second software application implemented on the second device, and the second application and the first application may have similar functionality. In some embodiments, the second icon may be identical to the first icon, as described above in relation to the universal application icon 328 in FIG. 3.

Block 724 may be followed by block 726, "ASSOCIATE FIRST ICON WITH THE SECOND ICON IN EQUIVALENCE MAP", where the first icon is associated with the second icon in an application equivalence map by the synchronization service application 622, as described above. The application equivalence map may be stored on the first device, the second device, and/or on a network (e.g., on the server 542 in FIG. 5).

Block 726 may be followed by block 728, "SYNCHRONIZE VIEWS POSITIONING SECOND ICON BASED ON POSITION OF FIRST ICON", where the application equivalence map may be used to synchronize the position of the second icon on the display of the second device with the position of the first icon on the display of the first device, as described above in relation to FIG. 2. For example, if the first icon is positioned in the upper left of the display of the first device, the second icon may also be positioned in the upper left of the display of the second device.

FIG. 8 illustrates a block diagram of an example computer program product, arranged in accordance with at least some embodiments described herein.

In some examples, as shown in FIG. 8, the computer program product 800 may include a signal bearing medium 802 that may also include one or more machine readable instructions 804 that, when executed by, for example, a processor, may provide the functionality described herein. Thus, for example, referring to the processor 604 in FIG. 6, the synchronizing service application 622 may undertake one or more of the tasks shown in FIG. 8 in response to the instructions 804 conveyed to the processor 904 by the signal bearing medium 802 to perform actions associated with synchronizing icon positioning between different devices as described herein. Some of those instructions may include, for example, detecting the position of a first icon on a first device, detecting a second icon on a second device, associated the first icon with the second icon in an equivalence map, and synchronizing views positioning the second icon based on the position of the first icon, according to some embodiments described herein.

In some implementations, the signal bearing medium 802 depicted in FIG. 8 may encompass a computer-readable medium 806, such as, but not limited to, a hard disk drive (HDD), a solid state drive (SSD), a compact disc (CD), a digital versatile disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, the computer program product 800 may be conveyed to one or more modules of the processor 604 by an RF signal bearing medium, where the signal bearing medium 802 is conveyed by the wireless communications medium 810 (e.g., a wireless communications medium conforming with the IEEE 802.11 standard).

According to some examples, a method for employing an application equivalence map for synchronized positioning of application icons across different device platforms may include detecting a position of a first icon associated with a first application relative to one or more of equivalent display elements, equivalent display features, built-in interface elements, and/or other icons displayed on a main view of a first user device and detecting a second icon associated with a second application on a main view of a second user device, where the first and second applications are functionally related, associating the first and second icons in the application equivalence map, and synchronizing the main views of the first and second user devices by selecting a relative position of the second icon on the main view of the second user device to be substantially similar to the relative position of the first icon on the main view of the first user device.

According to some embodiments, the method may further include detecting a third icon associated with a third application on a main view of a third user device, where the first, second, and third applications are functionally related, associating the third icon with the first and second icons in the application equivalence map, and synchronizing the main views of the first, second, and third user devices by selecting a relative position of the third icon on the main view of the third user device to be substantially similar to the relative positions of the first icon on the main view of the first user device and the second icon on the main view of the second user device.

According to other embodiments, the first, second, and third user devices may be a desktop computer, a laptop computer, a vehicle-mount computer, a tablet computer, a wearable computer, and/or a smart phone. The first, second, and third applications may perform analogous tasks. The method may further include implementing the application equivalence map at the first, second, and/or third user devices. The method may further include designating the first user device as a reference device and selecting the relative positions of the second and third icons based on the relative location of the first icon on the main view of the first user device.

According to further embodiments, the method may further include implementing the application equivalence map at a server communicatively coupled with the first, second, and third user devices, and/or providing the synchronization as a cloud-based service. The method may further include maintaining the association of the first, second, and third icons in a user configuration file accessible by the first, second, and third user devices, and translating the user configuration file into distinct application equivalence maps for the first, second, and third user devices. The application equivalence map may be customizable and provided with default values by an operating system provider or a user device provider. The method may further include building the application equivalence map through a machine learning technique based on usage of applications on the first and second user devices and associated file types.

According to yet further embodiments, the method may further include receiving equivalence information from an application provider and/or employing a visual scheme to further associate the first and second icons. The visual scheme may include a background color, an icon outline, a textual scheme, a highlighting scheme, and/or a shadowing scheme. The application equivalence map may be content sensitive and/or context sensitive. The method may further include associating the first and second icons based on a user device configuration including a selected input mechanism and/or a selected display mechanism, and/or providing a fourth icon on the main views of the first and second user devices, where the fourth icon is associated with two distinct applications on respective user devices performing analogous tasks.

According to other examples, a system for employing an application equivalence map for synchronized positioning of application icons across different device platforms may include at least one server communicatively coupled to multiple user devices. The server may be configured to detect a position of a first icon associated with a first application relative to other icons displayed on a main view of a first user device and detect a second icon associated with a second application on a main view of a second user device, where the first and second applications are functionally related, associate the first and second icons in the application equivalence map, and synchronize the main views of the first and second user devices by selecting a relative position of the second icon on the main view of the second user device to be substantially similar to the relative position of the first icon on the main view of the first user device.

According to some embodiments, the server(s) may be further configured to detect a third icon associated with a third application on a main view of a third user device, where the first, second, and third applications are functionally related, associate the third icon with the first and second icons in the application equivalence map, and synchronize the main views of the first, second, and third user devices by selecting a relative position of the third icon on the main view of the third user device to be substantially similar to the relative positions of the first icon on the main view of the first user device and the second icon on the main view of the second user device.

According to other embodiments, the first, second, and third user devices may be a desktop computer, a laptop computer, a vehicle-mount computer, a tablet computer, a wearable computer, and/or a smart phone. The first, second, and third applications may perform analogous tasks. The server(s) may be further configured to support the application equivalence map at the first, second, and/or third user devices. The server(s) may be further configured to designate the first user device as a reference device and select the relative positions of the second and third icons based on the relative location of the first icon on the main view of the first user device.

According to further embodiments, the application equivalence map may be stored at a data store managed by the server(s). The server(s) may be further configured to provide the synchronization as a cloud-based service and/or. The server(s) may be further configured to maintain the association of the first, second, and third icons in a user configuration file accessible by the first, second, and third user devices and translate the user configuration file into distinct application equivalence maps for the first, second, and third user devices. The application equivalence map may be customizable and provided with default values by an operating system provider or a user device provider. The server(s) may be further configured to build the application equivalence map through a machine learning technique based on usage of applications on the first and second user devices and associated file types.

According to yet further embodiments, the server(s) may be further configured to receive equivalence information from an application provider and/or employ a visual scheme to further associate the first and second icons. The visual scheme may include a background color, an icon outline, a textual scheme, a highlighting scheme, and/or a shadowing scheme. The application equivalence map may be content sensitive and/or context sensitive. The server(s) may be further configured to associate the first and second icons based on a user device configuration including a selected input mechanism and/or a selected display mechanism, and/or provide a fourth icon on the main views of the first and second user devices, where the fourth icon is associated with two distinct applications on respective user devices performing analogous tasks.

According to further examples, a computing device for employing an application equivalence map for synchronized positioning of application icons across different device platforms may include a display, a processor, and a communication module for communicating with a network. The processor may be configured to detect a position of a first icon associated with a first application relative to other icons displayed on a main view of the computing device and detect a second icon associated with a second application on a main view of another computing device, where the first and second applications are functionally related, associate the first and second icons in the application equivalence map, and synchronize the main views of the computing devices by selecting a relative position of the first icon on the main view of the user device to be substantially similar to the relative position of the second icon on the main view of the other computing device.

According to some embodiments, the computing devices may be a desktop computer, a laptop computer, a vehicle-mount computer, a tablet computer, a wearable computer, and/or a smart phone. The first and second applications may perform analogous tasks. The application equivalence map may be stored at one of the computing devices and/or at a data store coupled to the network and accessed by the processor. The application equivalence map may be customizable and provided with default values by an operating system provider or a user device provider.

According to other embodiments, the processor may be configured to build the application equivalence map through a machine learning technique based on usage of applications on the computing device and associated file types. The processor may also be configured to receive equivalence information from an application provider and/or employ a visual scheme to further associate the first and second icons. The visual scheme may include a background color, an icon outline, a textual scheme, a highlighting scheme, and/or a shadowing scheme. The processor may be further configured to associate the first and second icons based on a computing device configuration including a selected input mechanism and/or a selected display mechanism, and/or provide a third icon on the main view of the computing device, where the third icon is associated with two distinct applications on the computing devices performing analogous tasks.

According to yet further examples, a computer readable storage medium may store instructions for employing an application equivalence map for synchronized positioning of application icons across different device platforms. The instructions may include detecting a position of a first icon associated with a first application relative to other icons displayed on a main view of a first user device and detecting a second icon associated with a second application on a main view of a second user device, where the first and second applications are functionally related, associating the first and second icons in the application equivalence map, and synchronizing the main views of the first and second user devices by selecting a relative position of the second icon on the main view of the second user device to be substantially similar to the relative position of the first icon on the main view of the first user device.

According to some embodiments, the instructions may further include detecting a third icon associated with a third application on a main view of a third user device, where the first, second, and third applications are functionally related, associating the third icon with the first and second icons in the application equivalence map, and synchronizing the main views of the first, second, and third user devices by selecting a relative position of the third icon on the main view of the third user device to be substantially similar to the relative positions of the first icon on the main view of the first user device and the second icon on the main view of the second user device.

According to other embodiments, the first, second, and third user devices may be a desktop computer, a laptop computer, a vehicle-mount computer, a tablet computer, a wearable computer, and/or a smart phone. The first, second, and third applications may perform analogous tasks. The instructions may further include implementing the application equivalence map at the first, second, and/or third user devices. The instructions may further include designating the first user device as a reference device and selecting the relative positions of the second and third icons based on the relative location of the first icon on the main view of the first user device.

According to further embodiments, the instructions may further include implementing the application equivalence map at a server communicatively coupled with the first, second, and third user devices, and/or providing the synchronization as a cloud-based service. The instructions may further include maintaining the association of the first, second, and third icons in a user configuration file accessible by the first, second, and third user devices, and translating the user configuration file into distinct application equivalence maps for the first, second, and third user devices. The application equivalence map may be customizable and provided with default values by an operating system provider or a user device provider. The instructions may further include building the application equivalence map through a machine learning technique based on usage of applications on the first and second user devices and associated file types.

According to yet further embodiments, the instructions may further include receiving equivalence information from an application provider and/or employing a visual scheme to further associate the first and second icons. The visual scheme may include a background color, an icon outline, a textual scheme, a highlighting scheme, and/or a shadowing scheme. The application equivalence map may be content sensitive and/or context sensitive. The instructions may further include associating the first and second icons based on a user device configuration including a selected input mechanism and/or a selected display mechanism, and/or providing a fourth icon on the main views of the first and second user devices, where the fourth icon is associated with two distinct applications on respective user devices performing analogous tasks.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a Digital Versatile Disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to employ an application equivalence map for a synchronized positioning of application icons across different device platforms, the method composing:
   detecting a position of a first icon associated with a first application relative to one or more of equivalent display elements, equivalent display features, built-in interface elements, and other icons displayed on a main view of a first user device;
   detecting a position of a second icon associated with a second application on a main view of a second user device;
   designating the first user device as a reference device to store the application equivalence map;
   in response to receipt of a first indication of a first change in the position of one of the first icon from the first user device or the second icon from the second user device, updating the application equivalence map at the reference device based on the first indication of the first change;
   in response to the update of the application equivalence map, synchronizing a main view of the reference device and the main view of the second user device through a selection of the position of the second icon on the main view of the second user device to be substantially similar to the position of the first icon on the main view of the reference device; and
   associating the first icon and the second icon in the application equivalence map through a universal application icon that represents a particular functionality of the first application and the second application, instead of the first application and the second application, wherein:
   the universal application icon is displayed to link with the first application on the first user device and the second application on the second user device based on a configuration and a location of the first icon on the first user device and the second icon on the second user device, and
   the universal application icon is configured to facilitate transition between the first user device and the second user device.

2. The method of claim 1, further comprising:
   detecting a third icon associated with a third application on a main view of a third user device, wherein the first application, the second application, and the third application are functionally related;
   associating the third icon with the first icon and the second icon in the application equivalence map;
   in response to receipt of a second indication of a second change in position of one of the first icon from the first user device, the second icon from the second user device, or the third icon from the third user device, updating the application equivalence map at the reference device based on the second indication of the second change; and
   synchronizing the main view of the first user device, the main view of the second user device, and the main view of the third user device by providing the updated application equivalence map to the second user device and the third user device.

3. The method of claim 2, wherein the first user device, the second user device, and the third user device include one of a desktop computer, a laptop computer, a vehicle-mount computer, a tablet computer, a wearable computer, and a smart phone.

4. The method of claim 2, further comprising:
   maintaining the association of the first icon, the second icon, and the third icon in a user configuration file accessible by the first user device, the second user device, and the third user device; and
   translating the user configuration file into distinct application equivalence maps for the first user device, the second user device, and the third user device.

5. The method of claim 2, wherein the first application, the second application, and the third application perform analogous tasks.

6. The method of claim 2, further comprising:
   selecting the position of the second icon and the position of the third icon based on the position of the first icon on the main view of the first user device.

7. The method of claim 1, wherein synchronizing includes:
providing the synchronization as a cloud-based service.

8. The method of claim 1, wherein the application equivalence map is provided with default values by one of an operating system provider and a user device provider.

9. The method of claim 1, further comprising:
building the application equivalence map through a machine learning technique based on usage of the first application on the first user device and the second application on the second user device and associated file types.

10. The method of claim 1, wherein associating the first icon and the second icon includes: employing a visual scheme to associate the first icon and the second icon.

11. The method of claim 10, wherein the visual scheme includes one or more of a background color, an icon outline, a textual scheme, a highlight scheme, and a shadow scheme.

12. The method of claim 1, wherein the application equivalence map is one or more of content sensitive and context sensitive.

13. The method of claim 1,
wherein the association of the first icon and the second icon is based on one or more of a first display mechanism to display the first icon on the main view of the first user device and a second display mechanism to display the second icon on the main view of the second user device.

14. The method of claim 1, further comprising:
providing a third icon on the main view of the first user device and on the main view of the second user device, wherein the third icon is associated with two distinct applications respectively on the first user device and the second user device, and wherein the two distinct applications perform analogous tasks.

15. A system to employ an application equivalence map for synchronized positioning of application icons across different device platforms, the system comprising:
at least one server communicatively coupled to a first user device and a second user device, wherein the at least one server is configured to:
detect a position of a first icon associated with a first application relative to other icons displayed on a main view of the first user device;
detect a position of a second icon associated with a second application on a main view of the second user device;
receive equivalence information from an application provider;
designate the first user device as a reference device to store the application equivalence map at the at least one server;
in response to receipt of a first indication of a first change in the position of one of the first icon from the first user device or the second icon from the second user device, update the application equivalence map at the at least one server based on the first indication of the first change;
in response to the update of the application equivalence map, synchronize the main view of the first user device and the main view of the second user device through a selection of the position of the second icon on the main view of the second user device to be substantially similar to the position of the first icon on the main view of the first user device; and
associate the first icon and the second icon in the application equivalence map through a universal application icon that represents a particular functionality of the first application and the second application, instead of the first application and the second application, wherein:
the universal application icon is displayed to link with the first application on the first user device and the second application on the second user device based on a configuration and a location of the first icon on the first user device and the second icon on the second user device, and
the universal application icon is configured to facilitate transition between the first user device and the second user device.

16. The system of claim 15, wherein the at least one server is further configured to:
detect a third icon associated with a third application on a main view of a third user device, wherein the first application, the second application, and the third application are functionally related;
associate the third icon with the first icon and the second icon in the application equivalence map;
in response to receipt of a second indication of a second change in position of one of the first icon from the first user device, the second icon from the second user device, or the third icon from the third user device, update the application equivalence map at the reference device based on the second indication of the second change; and
synchronize the main view of the first user device, the main view of the second user device, and the main view of the third user device by providing the updated application equivalence map to the second user device and the third user device.

17. The system of claim 16, wherein the first application, the second application, and the third application perform analogous tasks.

18. The system of claim 16, wherein the at least one server is further configured to:
store the application equivalence map at one or more of the first user device, the second user device, and the third user device.

19. The system of claim 16, wherein the at least one server is further configured to:
select the position of the second icon and the position of the third icon based on the position of the first icon on the main view of the first user device.

20. The system of claim 16, wherein the at least one server is further configured to:
maintain the association of the first icon, the second icon, and the third icon in a user configuration file accessible by the first user device, the second user device, and the third user device; and
translate the user configuration file into distinct application equivalence maps for the first user device, the second user device, and the third user device.

21. The system of claim 15, wherein the at least one server is further configured to:
provide a third icon on the main view of the first user device and on the main view of the second user device, wherein the third icon is associated with two distinct applications respectively on the first user device and the second user device, and wherein the two distinct applications perform analogous tasks.

22. A computing device to employ an application equivalence map for a synchronized positioning of application icons across different device platforms, the computing device comprising:
a communication module to communicate with a network;
a display; and a processor coupled to the communication module and to the display, and configured to:

detect a position of a first icon associated with a first application relative to other icons displayed on a main view of the display of the computing device;

detect a position of a second icon associated with a second application on a main view of another computing device;

designate the computing device as a reference device to store the application equivalence map;

in response to receipt of an indication of a change in the position of one of the first icon from the computing device or the second icon from the another computing device, update the application equivalence map at the reference device based on the indication of the chance;

employ a visual scheme to associate the first icon and the second icon, wherein the visual scheme includes two or more of a background color, an icon outline, a textual scheme, a highlight scheme, and a shadow scheme;

synchronize the main view of the computing device and the main view of the another computing device through selection of the position of the first icon on the main view of the display of the computing device to be substantially similar to the position of the second icon on the main view of the another computing device;

associate the first icon and the second icon in the application equivalence map through a universal application icon that represents a particular functionality of the first application and the second application, instead of the first application and the second application, wherein:

the universal application icon is displayed to link with the first application on the computing device and the second application on the another computing device based on a configuration and a location of the first icon on the computing device and the second icon on the another computing device, and the universal application icon is configured to facilitate transition between the computing device and the another computing device.

23. The computing device of claim 22, wherein the processor is further configured to:

provide a third icon on the main view of the display of the computing device, wherein the third icon is associated with two distinct applications respectively on the computing device and the another computing device, and wherein the two distinct applications perform analogous tasks.

\* \* \* \* \*

UNITED STATES PATENT AND TRADEMARK OFFICE
CERTIFICATE OF CORRECTION

| | |
|---|---|
| PATENT NO. | : 9,760,244 B2 |
| APPLICATION NO. | : 14/009095 |
| DATED | : September 12, 2017 |
| INVENTOR(S) | : Kruglick |

It is certified that error appears in the above-identified patent and that said Letters Patent is hereby corrected as shown below:

In the Claims

Column 21, Line 15, Claim 22, delete "the chance;" and insert -- the change; --, therefor.

Signed and Sealed this
Seventeenth Day of April, 2018

Andrei Iancu
*Director of the United States Patent and Trademark Office*